A. M. Hill,
Reversible Latch.
No. 1,597. Reissued Jan. 5, 1864.
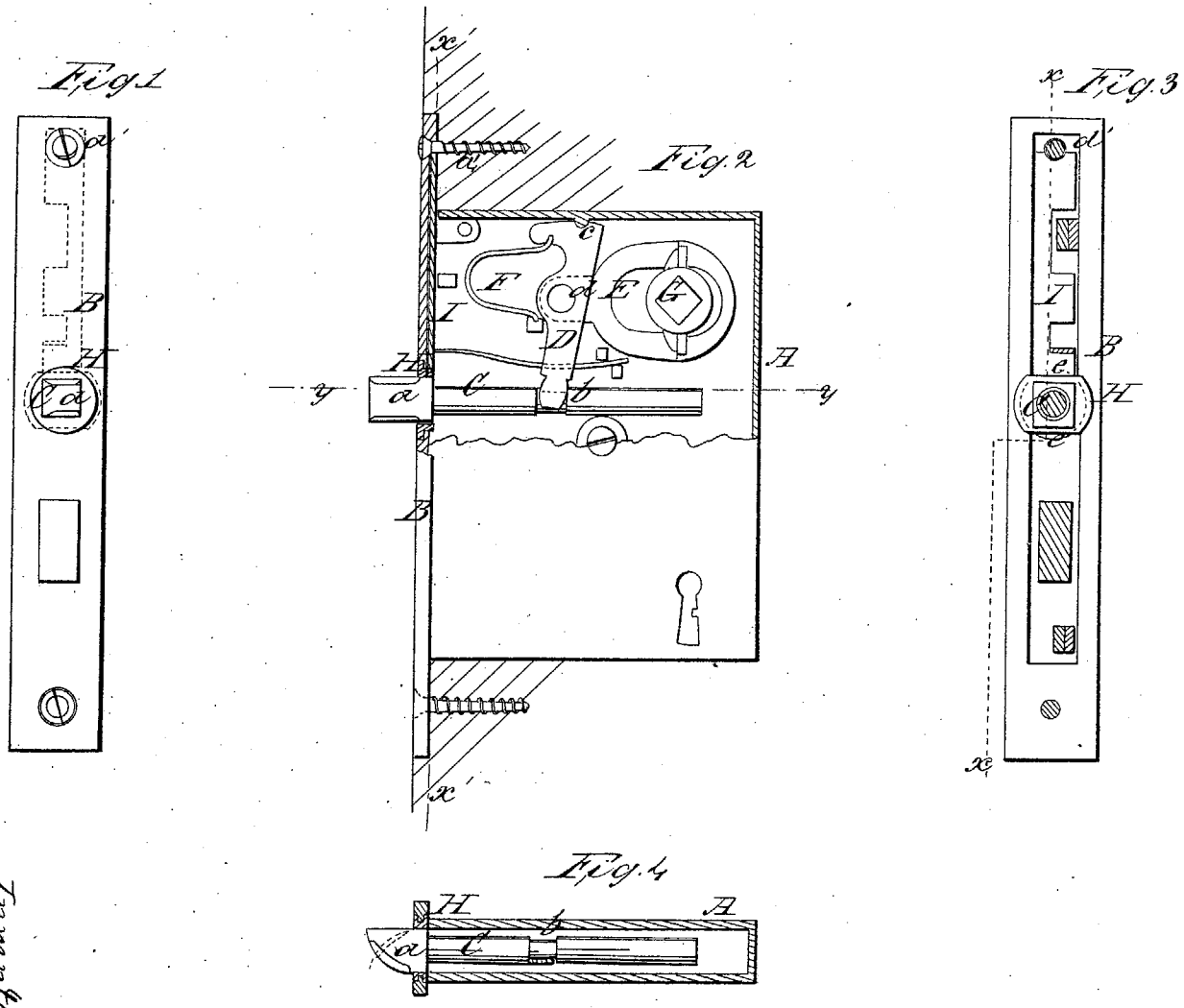
Witnesses
J. W. Coombs
R. S. Spinn
Inventor
A. M. Hill
per Munn & Co
Attorneys
AM. PHOTO-LITHO. CO. N.Y. (OSBORNE'S PROCESS.)

UNITED STATES PATENT OFFICE.

CHARLES A. MILLER, OF PHILADELPHIA, PENNSYLVANIA, ASSIGNEE, BY MESNE ASSIGNMENTS, OF ALBERT M. HILL, OF BRANFORD, CONN.

IMPROVEMENT IN KNOB-LATCHES.

Specification forming part of Letters Patent No. 32,551, dated June 11, 1861; Reissue No 1,597, dated January 5, 1864.

*To all whom it may concern:*

Be it known that I, CHARLES A. MILLER, of Philadelphia, Pennsylvania, have become the owner of certain Letters Patent of the United States for an Improvement in Locks and Knob-Latches, granted to W. S. Kirkham, of Branford, Connecticut, as the assignee of A. M. Hill, of said Branford, on the 11th day of June, A. D. 1861, which Letters Patent I now deem inoperative and invalid by reason of a defective and insufficient specification; and I do hereby declare the following to be a full, clear, and exact description of the said invention, reference being had to the accompanying drawings, and to the letters of reference marked thereon.

The invention of the said A. M. Hill relates to improvements in door-locks having latch-bolts which admit of being reversed, so that the locks can be so adjusted as to suit left and right handed doors; and the invention consists, first, of a latch-bolt so constructed, and so connected to a lock that it can be turned without in any degree withdrawing or detaching it from the lock-case and without removing the detachable plate of the same, thereby avoiding one of the main objections to locks with reversible latches as made prior to the said invention; secondly, a plate, or its equivalent, so arranged and applied to the lock in respect to the latch-bolt and to one of the screws by means of which the lock is secured to the door, that on withdrawing the screw the latch-bolt can be turned, and on reinserting the screw the latch-bolt will be prevented from turning, as fully described hereinafter.

In order to enable others skilled in the art to make and use the said invention, I will now proceed to describe its construction and operation.

On reference to the accompanying drawings, which form a part of this specification, Figure 1 is a view of the face-plate of a mortise-lock made in accordance with this invention. Fig. 2 is a view of the interior of the lock, the case being bisected as indicated by the lines *x x*, Fig. 3; Fig. 3, a transverse vertical section of the lock on the line *x' x'*, Fig. 2; and Fig. 4, a horizontal section on the line *y y*, Fig. 2. Similar letters refer to similar parts throughout the several views.

The lock which has in the present instance been selected to illustrate the invention is of the class well known by the term "mortises," A being the case, B the face-plate, and C the latch-bolt, the outer square end, *a*, of which is beveled on one side as usual.

The inner portion or stem of the latch bolt is of a cylindrical form, and is provided with a groove or recess, *b*, for the reception of the lower end of the lever D, which has its fulcrum at *c*, and is connected at *d* to the slide E, a spring, F, being applied to the said lever D and tending to force the end *a* of the latch-bolt outward from the lock.

G is the hub through which is a square hole for the reception of the usual square spindle to which the knobs are secured. The hub G, slide E, lever D, and spring F are too similar to those of other locks to need minute explanation.

The end *a* of the latch-bolt, which is square and beveled on one side, as described above, passes through a collar, H, which is so fitted to the face-plate B that it can turn freely therein, but can have no other movement independently of the said face plate. The edge of this collar H is cut away at two points, so that two flat or plane surfaces, *e e*, may be formed on the side edge, one of these surfaces being on one side and the other on the opposite side of the latch-bolt, as clearly shown in Fig. 3.

To the inside of the face-plate B is fitted a plate, I, on which a spring, J, is arranged, to so act as to depress the said plate, and cause its lower end to bear on one of the flat surfaces *e* of the collar H, thereby tending to prevent the collar and with it the latch-bolt from turning.

When the lock is fitted to the door, one of the screws *a'*, by means of which the lock is secured, and which passes through the face-plate B, prevents the plate from rising, and consequently prevents the turning of the collar and latch-bolt.

It will be readily seen that prior to securing the lock to the door the latch-bolt may be turned and its beveled end *a* caused to assure a position suitable either for a left or right handed lock.

The collar H is not indispensable, for if the end *a* of the latch-bolt be made cylindrical instead of square, and so as to fit snugly and slide freely in a circular opening in the face-plate B, the latch-bolt might be turned, and might be held after adjustment by a plate, I, or its equivalent, bearing on a flat surface formed on the said cylindrical end *a* of the latch-bolt. By making this end *a* of the latch-bolt cylindrical, however, and imparting to it the necessary bevel, the portion of the latch-bolt which projects beyond the face-plate of the lock would be of a peculiar form, and although it might be as efficient as an ordinary latch-bolt its peculiarity would form a serious bar to the introduction of the lock into the market. This was evidently the only reason for the adoption of the revolving collar H, which permits the use of a latch-bolt with a square end, *a*, having the usual bevel and being of the same appearance as an ordinary latch-bolt. In fact, the latch-bolt C may be termed a "cylindrical latch-bolt," as the circular collar H is to all intents and purposes a part of the latch-bolt as far as the turning of the latter is concerned.

Prior to this invention locks had been made with reversible latch-bolts, but this reversal could only be accomplished after removing the detachable plate of the lock, or after withdrawing a screw or screws and disconnecting the latch-bolt from the lock. In either case there are objections which the present invention was especially designed to obviate, and the main objection is that the reversing of the latch-bolt is generally accomplished by the carpenter whose duty it is to secure the lock to the door, and who is generally unskilled as regards the construction of locks.

The withdrawal of the screws and detachable plates, which frequently causes a displacement of the interior parts of the lock and the readjustment of the parts, are duties which, when performed by unskilled hands, cause more or less delay and frequently results in the loss of screws which cannot be readily replaced. No such duties are required in reversing the improved lock, no detachment of plates or screws, no disconnecting of the latch-bolt or any interference with the integrity of the lock is necessary for accomplishing the required reversal of the latch-bolt, which can be readily effected by the most inexperienced artisan.

Although a mortise-lock has been selected to illustrate the invention, it will be evident that it is applicable to an ordinary rim-lock.

It will also be evident that in whatever manner the screws which secure the lock to the door may be arranged one of the screws may be so situated in respect to the retaining-plate I or its equivalent as to maintain that plate in the depressed position necessary for preventing the latch from turning.

I claim as the invention of the said ALBERT M. HILL and desire to s cure by Letters Patent—

1. A latch-bolt so constructed and so connected to a door lock that it can be turned without in any degree withdrawing or detaching it from the lock-case, and without removing the detachable plate of the same.

2. The plate I or its equivalent so arranged and applied to the lock in respect to the latch-bolt and to one of the screws by which the lock is secured to the door that on withdrawing the said screw the latch-bolt can be turned and on reinserting the said screw the latch-bolt will be prevented from turning, as herein set forth.

In testimony whereof I have signed my name to this specification before two subscribing witnesses.

CHARLES A. MILLER.

Witnesses:
HENRY HOWSON,
JOHN WHITE.